United States Patent [19]

Murayama

[11] Patent Number: 5,772,140
[45] Date of Patent: Jun. 30, 1998

[54] DOUBLE-BEARING FISHING REEL WITH FISHING PARALLEL-WINDING UNIT AND DRIVE FORCE TRANSMISSION MECHANISM

[75] Inventor: Tomohiro Murayama, Kouchi, Japan

[73] Assignee: Daiwa Seiko, Inc., Tokyo, Japan

[21] Appl. No.: 808,966

[22] Filed: Feb. 19, 1997

[30] Foreign Application Priority Data

Feb. 20, 1996 [JP] Japan ..................................... 8-032197
Sep. 26, 1996 [JP] Japan ..................................... 8-254674

[51] Int. Cl.[6] .............................................. A01K 89/015
[52] U.S. Cl. .......................................................... 242/279
[58] Field of Search .................................. 242/274, 275, 242/277, 278, 279, 280, 281

[56] References Cited

FOREIGN PATENT DOCUMENTS

57-22541  5/1982  Japan .

Primary Examiner—Katherine Matecki
Attorney, Agent, or Firm—Sughrue, Mion, Zinn, Macpeak & Seas, PLLC

[57] ABSTRACT

A double-bearing reel for fishing which is intended to improve not only operability at the time of use but also the fishline playing-out operation and besides to offer improved assembling-disassembling workability. In the double-bearing reel for fishing, a handle shaft having a handle is rotatably supported with the side plate of a reel body at a location on a side opposite to a direction in which a fishline is played out with respect to a spool shaft which supports a spool. A drive force transmission mechanism for reciprocating a fishline guide body with respect to a fishline parallel-winding unit by transmitting drive force from the handle shaft to the fishline parallel-winding unit is provided between the handle shaft and the fishline parallel-winding unit and within the side plate on the side where the handle is disposed.

14 Claims, 5 Drawing Sheets

DOUBLE-BEARING FISHING REEL WITH FISHING PARALLEL-WINDING UNIT AND DRIVE FORCE TRANSMISSION MECHANISM

BACKGROUND OF THE INVENTION

The present invention relates to a double-bearing reel for fishing.

As disclosed in Japanese Utility Model Publication No. 22541/1982, for example, a conventional double-bearing reel for fishing is designed so that while a spool for use in winding up a fishline is rotatably supported with both side plates of a reel body, the fishline is wound on the spool by rotating a fishline-winding handle supported with one side plate on the front side (fishline playing-out side) of the spool. A fishline guide body which is rotatable in linking with the handle is supported with the front side plates of the reel body at a location in front of a handle shaft and reciprocates in the axial direction of the spool, so that the parallel winding of the fishline on the spool is carried out via the fishline guide body.

However, the aforementioned generally known double-bearing reel for fishing has posed the following practical problem because the fishline-winding handle is fitted to the side plate at a location in front of a spool shaft.

While the reel body is gripped with one hand, a stable winding operation is hardly performable because the handle position tends to part from the body of an angler when the angler rotates the handle with the other hand for the winding operation. When the reel is held with the hand, moreover, it is hardly easy to turn a control knob with tips of fingers because the knob for controlling the pressure contact of the spool shaft end is situated in the rear of the handle.

SUMMARY OF THE INVENTION

An object of the present invention is to provide a double-bearing reel for fishing which is intended to improve not only operability at the time of use but also the fishline playing-out operation and besides to offer excellent assembling-disassembling workability.

In order to accomplish the object above, a double-bearing reel for fishing according to the present invention comprises a spool which is rotatably supported between the side plates of a reel body, and a fishline parallel-winding unit for winding a fishline in parallel on the spool by reciprocating a fishline guide body in the axial direction of the spool which is rotatable in linking with a handle, and is characterized in that a handle shaft having the handle is rotatably supported with the side plate of the reel body at a location on a side opposite to a direction in which the fishline is played out with respect to a spool shaft which supports the spool and that a drive force transmission mechanism for reciprocating the fishline guide body with respect to the fishline parallel-winding unit by transmitting drive force from the handle shaft to the fishline parallel-winding unit is provided within the side plate on the handle side and between the handle shaft and the fishline parallel-winding unit.

In the double-bearing reel for fishing thus arranged according to the present invention, the handle shaft fitted with the rotatable handle is rotatably supported with the side plate of the reel body at a location on a side opposite to a direction in which the fishline is played out with respect to a spool shaft which supports the spool on which the fishline is wound, so that the operability of the reel is made improvable by setting the handle fitting position closer to an angler.

The drive force transmission mechanism for reciprocating the fishline guide body with respect to the fishline parallel-winding unit by transmitting drive force from the handle shaft to the fishline parallel-winding unit is provided within the side plate on the handle side between the handle shaft and the fishline parallel-winding unit, whereby workability at the time the component parts of the reel are incorporated therein or the reel is dismantled can be improved. Moreover, disposing the drive force transmission mechanism on the handle-side plate makes it possible to prevent the fishline guide body from being reciprocated when the fishline is played out, whereby the fishline playing-out operation is improved.

In the double-bearing reel for fishing thus arranged according to the present invention, it may also be arranged to make the drive force transmission mechanism independent of the spool-shaft driving force transmission means used for transmitting the drive force from the handle shaft to the spool shaft so as to transmit the drive force from the handle shaft to the fishline parallel-winding unit via no spool shaft driving force transmission means. Otherwise, it may also be arranged to include the spool-shaft driving force transmission means and the fishline parallel-winding unit driving force transmission means for transmitting the drive force from the spool-shaft driving force transmission means to the fishline parallel-winding unit so as to transmit the drive force from the handle shaft to the fishline parallel-winding unit via the spool-shaft driving force transmission means and the fishline parallel-winding unit driving force transmission means.

DETAILED DESCRIPTION OF THE PREFERRED EMBODIMENTS

A detailed description will subsequently be given of a double-bearing reel for fishing in various modes of implementing the present invention by reference to the attached drawings.

Figure 1:
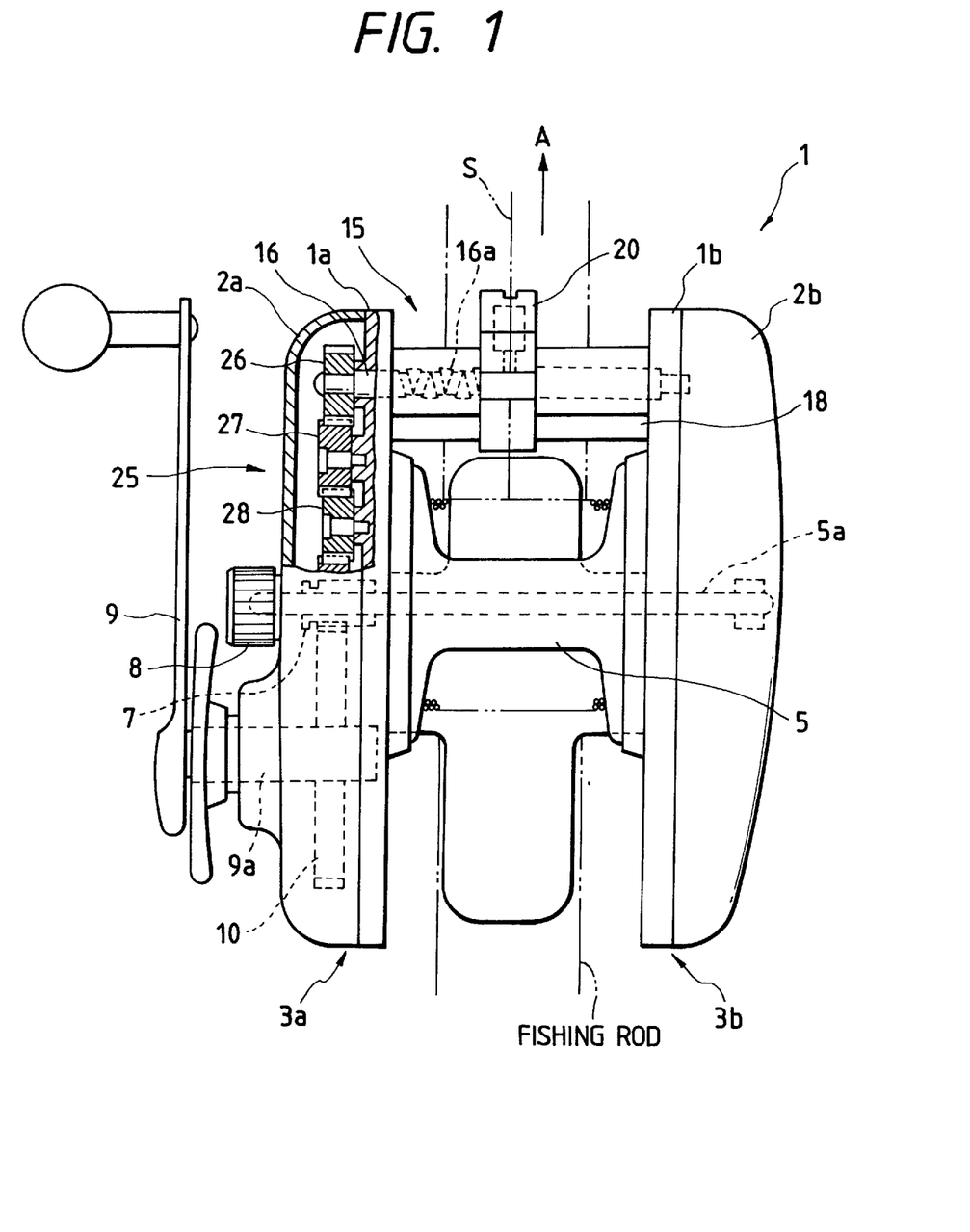
FIG. 1 is a partial cutaway plan view of a double-bearing reel for fishing according to a first embodiment of the invention.
Figure 2:
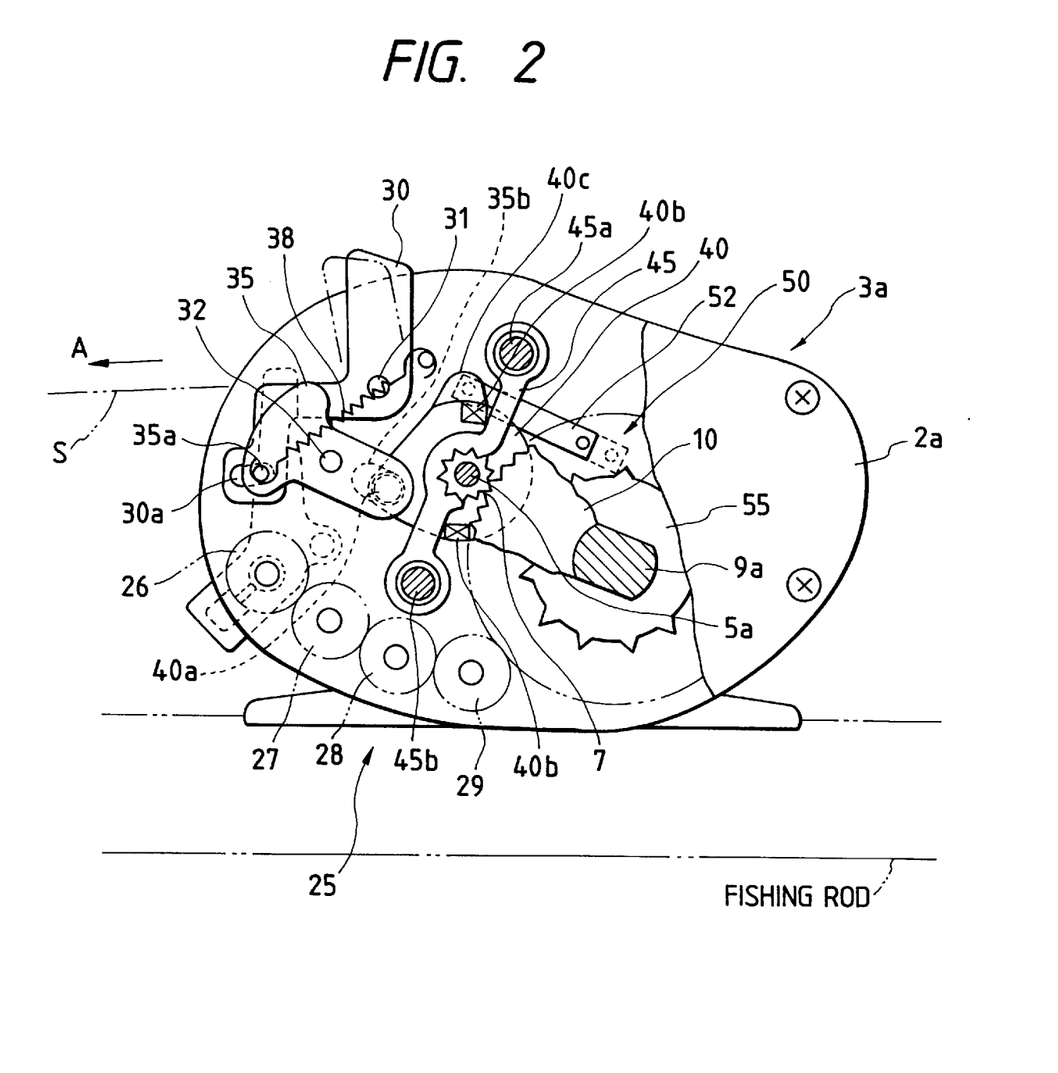
FIG. 2 is a side view of the double-bearing reel for fishing with a partial cutaway view of a cover member in order to show an internal structure including a drive force transmission mechanism in the side plate on the handle side of the double-bearing reel for fishing shown in FIG. 1.

FIG. 1 is a partial cutaway plan view of a double-bearing reel for fishing according to the first embodiment of the invention, and FIG. 2 a side view of the double-bearing reel for fishing with a partial cutaway view of a cover member in order to show an internal structure including a drive force transmission mechanism in the side plate on the handle side of the double-bearing reel for fishing shown in FIG. 1.

As shown in FIG. 1, a reel body 1 has a left and a right frame 1a, 1b, and a left and a right side plates 3a, 3b with cover members 2a, 2b respectively for covering these frames. A spool shaft 5a which is fitted with a spool 5 is rotatably supported via bearings between the left and right side plates 3a, 3b. A pinion 7 is installed on the side of the end portion of the spool shaft 5a (on the side of the left side plate according to this embodiment of the invention), the pinion being movable (in the axial direction) to a position where it engages with the spool shaft 5a and a position where it remains disengaged therefrom in accordance with the operation of a clutch switching lever, which will be described later. Further, a knob 8 for controlling the pressure contact of the spool shaft end is disposed in a position where the control knob projects from the left cover member 2a, so that the brake is applicable to the spool shaft 5a as desired.

A handle shaft 9a fitted with a handle 9 is rotatably supported with the left side plate 3a on the rear side which is situated opposite to the direction A in which a fishline is played out with respect to the spool shaft 5a. A drive gear 10 meshing with the pinion 7 is installed on the base end side of the handle shaft 9a. Consequently, the spool 5 is driven to rotate via the drive gear 10 and the pinion 7 when the handle 9 is rotated. Incidentally, the drive gear 10 may be fixed directly to the handle shaft 9a or may be made to friction-engage rotatably therewith by means of a drag unit. Further, a clutch mechanism, which will be described later, is disposed within the left side plate 3a and when the clutch switching lever is operated, the spool 5 is set free to rotate in the direction in which the fishline is played out.

A fishline parallel-winding unit 15 is disposed between the left and right side plates 3a, 3b on the side from which the fishline is played out with respect to the spool 5. The fishline parallel-winding unit 15 is provided with a traverse cam shaft 16 with a traverse cam groove 16a formed in the outer peripheral face and a fishline guide body 20 which is made slidable along a guide shaft 18 which mates with the traverse cam groove 16a and is supported between the left and right side plates 3a, 3b. The fishline S is wound on the spool 5 (played out of the spool 5) through a hole formed in the fishline guide body 20.

The fishline guide body 20 is reciprocated along the guide shaft 18 when the handle 9 is rotated. The fishline guide body 20 is driven to reciprocate via a drive force transmission mechanism 25 provided between the handle shaft 9a and the fishline parallel-winding unit 15. The drive force transmission mechanism 25 is disposed in the left side plate 3a on the handle side and as shown in FIGS. 1–2, has a gear 26 fitted to the end portion of the traverse cam shaft 16, gears 27, 28 which successively engage with the gear 26, and a gear 29 which engages with the gear 28 and simultaneously with the drive gear 10.

With this arrangement, the rotational drive force is transmitted via the drive gear 10, the gears 29, 28, 27, 26 when the handle 9 is rotated and thus the traverse cam shaft 16 is rotated. Therefore, the fishline guide body 20 engaging with the traverse cam groove 16a is reciprocated along the spool shaft 5a in linking with rotation of the spool 5, and the parallel winding of the fishline on the spool 5 is carried out.

A description will subsequently be given of the clutch mechanism for making the spool 5 freely rotate in the direction in which the fishline is played out by reference to FIG. 2. The clutch mechanism is driven through the operation of a clutch switching lever 30 projected toward a position so that it is readily manually operated. As shown in FIG. 2, the clutch switching lever 30 is formed stepwise and rotatably supported by a bearing shaft 31 in the left side plate 3a. A slit 30a is formed in the leading end portion of the clutch switching lever 30, and the mating pin 35a of a coupling body 35 rotatably supported by a bearing shaft 32 in the left side plate 3a is inserted in that portion. One end of a dead-point spring 38 is fitted to the mating pin 35a, and the other end of the dead-point spring is fitted to the left side plate 3a. The dead-point spring 38 allows the clutch switching lever 30 to be held in the ON and OFF positions. A slit 35b is formed opposite to the mating pin 35a of the coupling body 35, and the mating projection 40a of a pivot cam 40 pivotally supported in the left side plate 3a around the spool shaft 5a is inserted in that slit portion.

An annular cut groove is formed in the outer peripheral face of the pinion 7 axially movably fitted to the end portion of the spool shaft 5a. A clutch plate 45 whose both arm portions are slidably supported by a pair of guide support shafts 45a, 45b fixed to the respective upper and lower sides of the spool shaft 5a in FIG. 2 on the left side face (i.e., outer side face) of the left frame 1a mates with that annular cut groove in a direction along the center line of the spool shaft 5a in the longitudinal direction. Springs arranged at the respective tips of both arms normally urge the clutch plate 45 so as to keep it in contact with the surface of the pivot cam 40. Inclined cam faces 40b capable of mating with the respective arm portions of the clutch plate 45 are formed in the peripheral end portion of the pivot cam 40 and when the pivot cam 40 is turned clockwise from the position shown in FIG. 2, the cam faces 40b cause the clutch plate 45 to be raised in a direction perpendicular to the surface of the drawing against the urging force of the springs because of the inclination of the cam faces 40b. When the clutch plate 45 is thus raised, the pinion 7 is slid to a position where it is freely rotatable with respect to the spool shaft 5a.

A protrusion 40c which is fitted with the base end portion of the reset plate 52 of a reset mechanism 50 is formed in the outer peripheral portion of the pivot cam 40. When the pivot cam 40 is turned clockwise, the leading end portion of the reset plate 52 is capable of engaging with a reset gear 55 integrally rotatable with the handle shaft 9a.

A detailed description will subsequently be given of the operation of the double-bearing reel constructed as aforementioned by reference to FIG. 2.

A solid line in FIG. 2 refers to the ON state of the clutch and when the handle 9 is turned to rotate the handle shaft 9a in the fishline-winding direction, drive force is transmitted to the spool shaft 5a via the drive gear 10 and the pinion 7, and the spool 5 is driven to rotate in the fishline-winding direction. The rotation of the drive gear 10 is transmitted to the traverse cam shaft 16 via the drive force transmission mechanism 25, and the fishline guide body 20 brought into engagement with the traverse cam groove 16a is reciprocated along the spool shaft 5a, whereby the parallel winding of the fishline on the spool 5 is carried out.

When the clutch switching lever 30 is operated as shown by a chain double-dashed line, the clutch switching lever 30 is turned counterclockwise on the bearing shaft 31, and the coupling body 35 is also turned counterclockwise on the bearing shaft 32. When the coupling body 35 is turned counterclockwise, the pivot cam 40 is turned clockwise via the mating projection 40a, and the clutch plate 45 is lifted up by the cam faces 40b against the urging force of the springs disposed on the respective ends of the clutch plate 45. When the clutch plate 45 is lifted up, the pinion 7 is slid to the position where it is freely rotatable with respect to the spool shaft 5a, whereby the engagement between the pinion 7 and the spool shaft 5a is severed (OFF state of the clutch); incidentally, this state is held by the deadpoint spring 38.

Then the spool shaft 5a becomes freely rotatable in the direction in which the fishline is played out, thus making terminal tackles releasable. When the terminal tackles are released, the spool shaft 5a is rotated at the same time but the drive gear 10 is never rotated simultaneously with the spool shaft 5a since the clutch is held OFF. Therefore, no rotational drive force is transmitted to the drive force transmission mechanism 25 which is kept in engagement with the drive gear 10 and the fishline guide body 20 is not allowed to reciprocate in the axial direction when the terminal tackles are released. Since the fishline guide body 20 is not reciprocated when the terminal tackles are released, it is unnecessary to pay attention to the reciprocation of the fishline guide body 20, so that the efficiency of releasing the terminal tackles is improved as the angler is allowed to devote himself to the fishline playing-out operation.

While the clutch switching lever 30 is held OFF after the operation of playing out the fishline, the reset gear 55 fitted to the handle shaft 9a forces back the reset plate 52 when the handle 9 is rotated in the fishline-winding direction and rotates the pivot cam 40 counterclockwise. When the pivot cam 40 is thus rotated, the clutch plate 45 is brought into contact with the surface of the pivot cam 40 because of the urging force of the springs, whereby the pinion 7 engages with the spool shaft 5a and returns to the position where both of them are integrally rotated. then the clutch switching lever 30 is turned to the position shown by the solid line and kept therein by the dead-point spring 38. In other words, the ON state of the clutch is restored when the handle 9 is operated in the fishline-winding direction.

As described above, the handle shaft 9a is supported with the side plate 3a of the reel body 1 on the side opposite to the direction in which the fishline is played out with respect to the spool shaft 5a used to support the spool 5. Therefore, the position where the handle 9 is operated can be set closer to the angler's body and when the operation of winding up the fishline is performed, the handle position is prevented from parting from the angler's body to ensure that a stable fishline winding operation is performable. Further, the installation of the handle shaft 9a in the rear of the spool shaft 5a facilitates the handling of the control knob 8 with tips of fingers.

Since the drive force transmission mechanism 25 for transmitting the drive force received via the handle shaft 9a to the fishline parallel-winding unit 15 so as to reciprocate the fishline guide body 20 along the fishline parallel-winding unit 15 is installed between the handle shaft 9a in the left side plate 3a and the fishline parallel-winding unit 15, it is necessary to disassemble only the left side plate 3a when the drive force transmission mechanism 25 is incorporated into or detached from the reel. Therefore, assembling-disassembling workability at the time of manufacture is improved.

Although a description has been given of the double-bearing reel for fishing according to the first embodiment of the invention by reference to FIGS. 1–2, the double-bearing reel for fishing according to this embodiment of the invention may be modified in various ways; for example, the number of gears constituting a gear train in the drive force transmission mechanism 25 may properly be varied with the size of the reel body 1 or the drive gear 10 or the constitution of the clutch mechanism.

Figure 3:
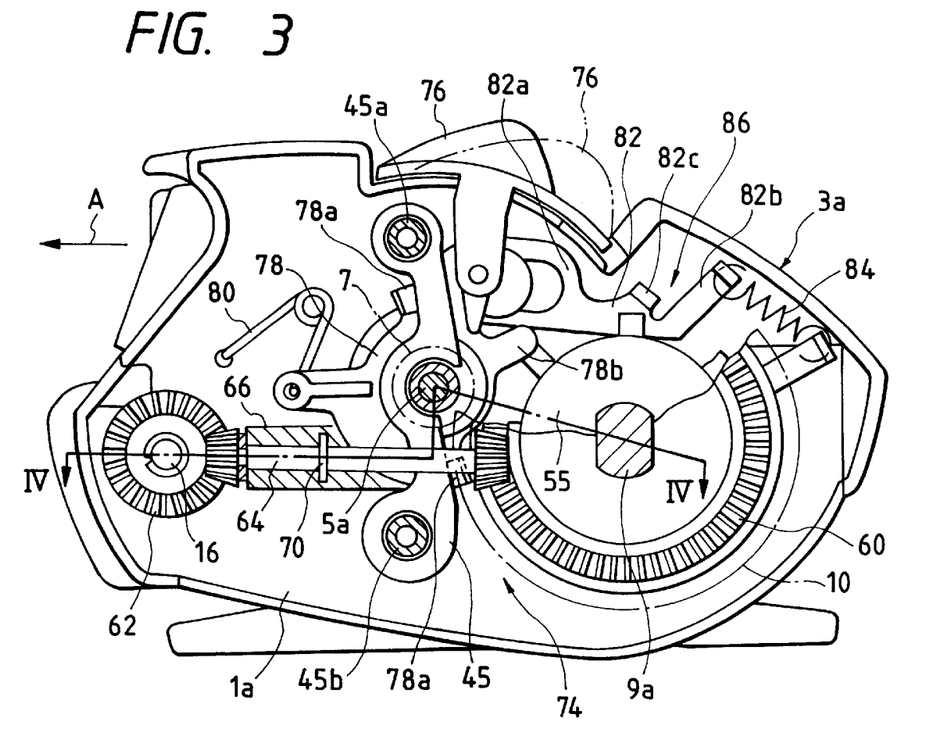
FIG. 3 is a side view of a double-bearing reel for fishing with a cover member removed in order to show an internal structure including a drive force transmission mechanism in the side plate on the handle side of the double-bearing reel for fishing according to a second embodiment of the invention.
Figure 4:
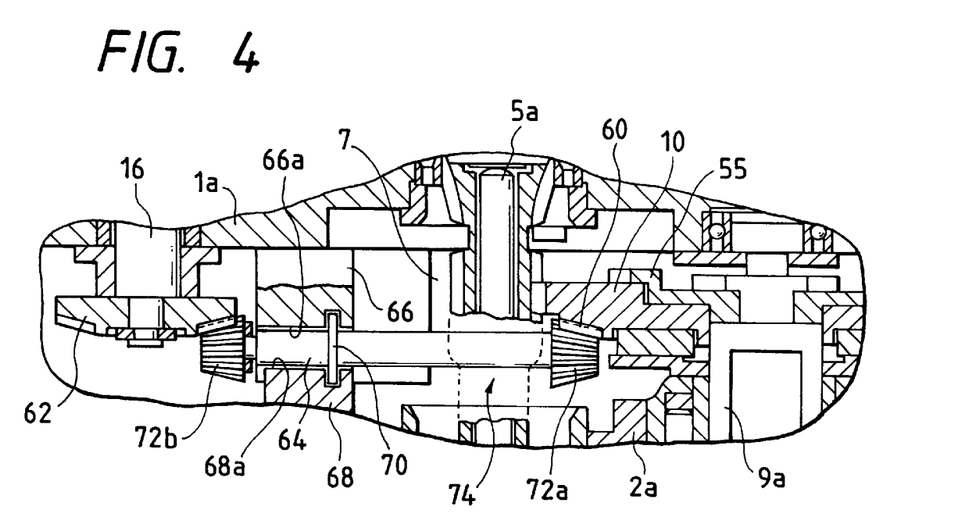
FIG. 4 is a sectional view taken on line IV—IV of FIG. 3.

FIG. 3 is a side view of a double-bearing reel for fishing with a cover member removed in order to show an internal structure including a drive force transmission mechanism in the side plate on the handle side of the double-bearing reel for fishing according to a second embodiment of the invention, and FIG. 4 is a sectional view taken on line IV—IV of FIG. 3.

In FIGS. 3–4, like reference characters designate like or corresponding component members of the double-bearing reel for fishing according to the first embodiment of the invention by reference to FIGS. 1–2 and the detailed description of them will be omitted.

According to this embodiment of the invention, a large bevel gear 60 is formed on the outer side face of the drive gear 10 fixed to the handle shaft 9a outside the left frame 1a of the left side plate 3a. Further, a small bevel gear 62 is fixed to the traverse cam shaft 16 of the fishline parallel-winding unit 15 of FIG. 1 for reciprocating the fishline guide body 20 of FIG. 1 outside the left frame 1a of the left side plate 3a. The small bevel gear 62 functions as an input gear for transmitting the drive force to the traverse cam shaft 16.

On the outside of the left frame 1a of the left side plate 3, and on an outer side than the clutch plate 45 which is selectively moved between the position where the pinion 7 engaging with the drive gear 10 on the spool shaft 5a is made to engage with the spool shaft 5a and the position where the pinion 7 is released from engaging with the spool shaft 5a, a drive force transmission shaft 64 is extended from a position opposite to the large bevel gear 60 up to a position opposite to the small bevel gear 62 along a straight line connecting the center line of rotation of the handle shaft 9a and that of rotation of the traverse cam shaft 16 with respect to a lower guide support shaft 45b out of a pair of guide support shafts 45a, 45b for the spool shaft 5a and the clutch plate 45.

The drive force transmission shaft 64 is rotatably supported by a semi-bearing surface 66a formed on the edge face of an outer shaft support projection 66 projecting outward from between the small bevel gear 62 and the clutch plate 45 on the outer side face of the left frame 1a of the left side plate 3a and by a semi-bearing surface 68a formed on the edge face of an inner shaft support projection 68 formed opposite to the outer shaft support projection 66 on the inner side face of the cover member 2a detachably fixed to the left frame 1a. An annular member 70 rotatably engaging with the peripheral mating groove in the outer periphery of the drive force transmission shaft 64 is accommodated in an annular member accommodating groove formed in the semi-bearing surface 66a on the outer side face of the left frame 1a and the semi-bearing surface 68a on the inner surface of the cover member 2a, whereby the movement of the drive force transmission shaft 64 along the center line (i.e., center line of rotation) of the drive force transmission shaft 64 in the longitudinal direction is controlled.

Bevel gear pinions 72a, 72b each engaging with the large bevel gear 60 and the small bevel gear 62 are fixed to the respective end portions of the drive force transmission shaft 64. Therefore, the drive force that has been input to the handle shaft 9a via the handle 9 of FIG. 1 is transmitted from the large bevel gear 60 of the handle shaft 9a via the bevel gear pinions 72a, 72b on both sides of the drive force transmission shaft 64 up to the small bevel gear 62 of the traverse cam shaft 16 of the fishline parallel-winding unit 15. In other words, according to this embodiment of the invention, the large bevel gear 60, the drive force transmission shaft 64 having the bevel gear pinions 72a, 72b on both sides and the small bevel gear 62 constitute a drive force transmission mechanism 74 for transmitting the drive force from the handle shaft 9a to the fishline parallel-winding unit 15 of FIG. 1 so as to reciprocate the fishline guide body 20 of FIG. 1.

In comparison with the aforementioned drive force transmission mechanism 25 according to the first embodiment of the invention as shown in FIGS. 1–2, the drive force transmission mechanism 74 thus constructed according to the second embodiment of the invention contributes to smoothing the fishing operation because the number of gears is small, thus decreasing a backlash. Consequently, manufacturing, assembling and disassembling work is facilitated.

In FIG. 3, a solid line refers to the clutch-on position of a clutch switching lever 76 and a chain double-dashed line to its clutch-off position.

In the aforementioned second embodiment of the invention, the clutch-off mechanism for moving the clutch plate 45 together with the pinion 7 from the engagement position to the engagement releasing position by switching the clutch switching lever 76 from the clutch-on position to the clutch-off position as described above is different from the clutch-off mechanism in the first embodiment thereof, and so is the reset mechanism from the reset mechanism 50 in the first embodiment thereof as shown in FIGS. 1–2 in that the reset mechanism in the second embodiment thereof operates to return the clutch plate 45 together with the pinion 7 from the engagement releasing position to the engagement position when the handle 9 is rotated and to simultaneously automatically make the clutch switching lever 76 return from the clutch-off position to the clutch-on position.

A description will subsequently be given of the clutch-off mechanism and the reset mechanism according to the second embodiment of the invention.

The clutch switching lever 76 according to this embodiment of the invention is fixed to the upper end portion of a pivot cam 78 rotatably disposed around the spool shaft 5a between the left side face of the left frame 1a and the clutch plate 45 and around the center line of rotation of the spool shaft 5a. A dead-point spring 80 in the form of a coil spring is stretched between the pivot cam 78 and the left side face of the left frame 1a. The pivot cam 78 places the clutch switching lever 76 in the clutch-on position or the clutch-off position arranged in the clutch-on position shown by the solid line or the clutch-off position shown by the chain double-dashed line by means of the urging force of the dead-point spring 80.

The pivot cam 78 has cam faces 78a so positioned as to face the clutch plate 45 on both sides of the spool shaft 5a and when the clutch switching lever 76 is moved from the clutch-on position shown by the solid line in FIG. 3 to the clutch-off position shown by chain double-dashed line, the cam faces 78a are brought into slidable contact with the clutch plate 45 on both sides of the spool shaft 5a so as to lift up the clutch plate 45 in a direction in which it is moved away from the left side face of the left frame 1a against the urging force of the aforementioned spring (not shown). Consequently, the pinion 7 moved together with the clutch plate 45 on the spool shaft 5a is moved to a free rotational position with respect to the spool shaft 5a.

In this embodiment of the invention, the clutch switching lever 76, the pivot cam 78 with the cam faces 78a and the clutch plate 45 constitute a clutch-off mechanism.

A reset plate 82 is extended over the left side face of the left frame 1a and between the upper end portion of the pivot cam 78 and the upper portion of the reset gear 55. One end portion 82a of the reset plate 82 corresponding to the upper end portion of the pivot cam 78 is rotatably coupled to a fixed shaft installed in the upper end portion of the pivot cam 78 with a gap held therebetween. In the other end portion 82b of the reset plate 82 positioned above the reset gear 55 is an urging means 84 in the form of a tension coil spring stretched with respect to the left side face of left frame 1a, and the urging means 84 is used to urge the reset plate 82 in a direction opposite to the direction A in which the fishline is played out and a direction in which it is moved close to the upper portion of the reset gear 55. The other end portion 82b of the reset plate 82 is restrained by a slidable contact support means (not shown) from moving close to the reset gear 55.

A mating projection 82c is formed in the proximity of the other end portion 82b of the reset plate 82.

A pressing projection 78b projected toward one end portion 82a of the reset plate 82 between the cam faces 78a of the pivot cam 78 is brought into contact with the one end portion 82a of the reset plate 82. White the pivot cam 78 together with the clutch switching lever 76 is placed in the aforementioned clutch-on position shown by the solid line in FIG. 3, the pressing projection 78b of the pivot cam 78 lifts the one end portion 82a of the reset plate 82 upward in FIG. 3 and the mating projection 82c of the reset plate 82 is drifted away from the moving locus of the reset gear 55.

When the clutch switching lever 76 is moved from the clutch-on position shown by the solid line in FIG. 3 to the clutch-off position shown by the chain double-dashed line, the pivot cam 78 is turned clockwise from the clutch-on position shown by the solid line in FIG. 3 and the upper end portion of the pivot cam 78 is turned clockwise from the position shown by the solid line in FIG. 3 and further the pressing projection 78b is turned clockwise, that is, downward from the position shown by the solid line in FIG. 3. Then the upper end portion of the pivot cam 78 presses the one end portion 82a of the reset plate 82 rightward from the position shown by the solid line in FIG. 3, and the pressing projection 78b allows the one end portion 82a of the reset plate 82 to move downward from the position shown by the solid line in FIG. 3. In consequence, the mating projection 82c of the reset plate 82 is placed within the moving locus of the reset gear 55.

When the handle 9 of FIG. 1 is then rotated in the direction in which the fishline S is wound up, the rotational force of the handle 9 is input via the handle shaft 9a to the reset gear 55, which is rotated counterclockwise in FIG. 3, whereby the mating projection 82c of the reset plate 82 is pressed leftward in FIG. 3 to press the reset plate 82 toward the position shown by the solid line in FIG. 3 against the urging force of the urging means 84. The pivot cam 78 is pressed with one end portion 82a of the reset plate 82 against the urging force of the dead-point spring 80 and together with the clutch switching lever 76 is turned from the clutch-off position (only the clutch switching lever 76 is shown by the chain double-dashed line) to the clutch-on position shown by the solid line in FIG. 3. The turning of the pivot cam 78 causes the pressing projection 78b of the pivot cam 78 to lift the one end portion 82a of the reset plate 82 upward in FIG. 3 and allows the pressing projection 78b of the reset plate 82 to drift away from the moving locus of the reset gear 55 as shown in FIG. 3.

When the pivot cam 78 is moved to the clutch-on position shown by the solid line in FIG. 3, the clutch plate 45 moves the pinion 7 to the position where the pinion 7 engages with the spool shaft 5a and transmits the rotational force input by the handle 9 to the spool 5 of FIG. 1 via the handle shaft 9a, the drive gear 10, the pinion 7 and the spool shaft 5a, so that the spool 5 is rotated in the fishline-winding direction.

The reset plate 82 and the reset gear 55 thus constitute a reset mechanism 86 according to this embodiment of the invention.

Figure 5:
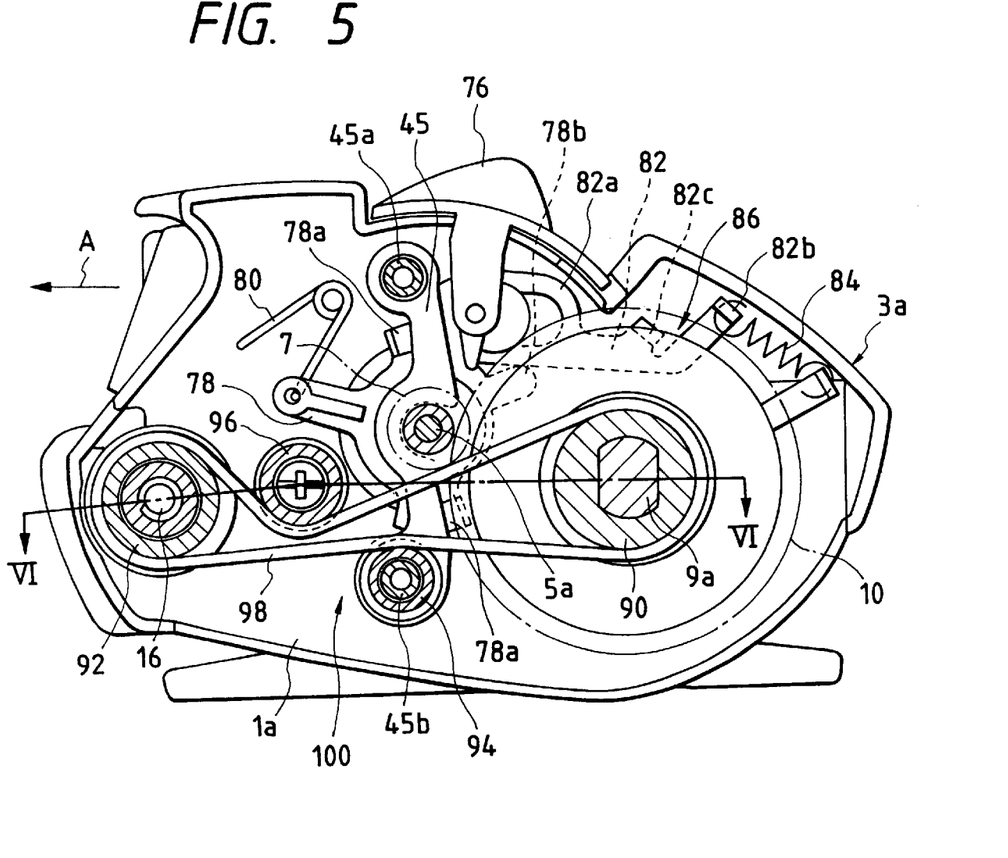
FIG. 5 is a side view of a double-bearing reel for fishing with a cover member removed in order to show an internal structure including a drive force transmission mechanism in the side plate on the handle side of the double-bearing reel for fishing according to a third embodiment of the invention.
Figure 6:
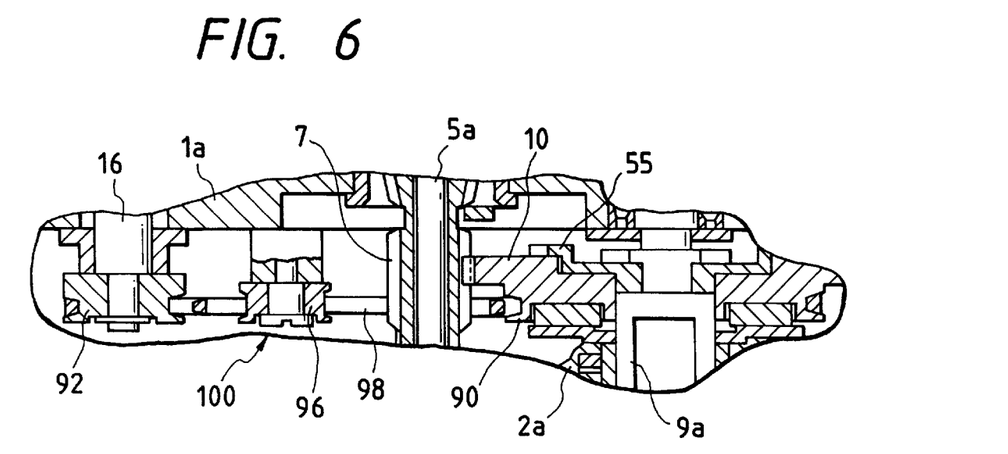
FIG. 6 is a sectional view taken on line VI—VI of FIG. 5.

FIG. 5 is a side view of a double-bearing reel for fishing with a cover member removed in order to show an internal structure including a drive force transmission mechanism in the side plate on the handle side of the double-bearing reel for fishing according to a third embodiment of the invention, and FIG. 6 a sectional view taken on line VI—VI of FIG. 5.

In FIGS. 5–6, like reference characters designate like or corresponding component members of the double-bearing reel for fishing according to the first embodiment of the invention by reference to FIGS. 1–2 and like or corresponding component members of the double-bearing reel for fishing according to the second embodiment of the invention by reference to FIGS. 3–4, and the detailed description of them will be omitted.

According to this embodiment of the invention, an output pulley 90 is formed on the outer side face of the drive gear 10 fixed to the handle shaft 9a outside the left frame 1a of the left side plate 3a. Further, an input pulley 92 is fixed to the traverse cam shaft 16 of the fishline parallel-winding unit 15 of FIG. 1 for reciprocating the fishline guide body 20 of FIG. 1 outside the left frame 1a of the left side plate 3a. The input pulley 92 is used for inputting the drive force to the traverse cam shaft 16.

On the outside of the left frame 1a of the left side plate 3, and on an outer side than the clutch-off position in the lower end portion of the clutch plate 45, a first driven pulley 94 is rotatably supported by a lower guide support shaft 45b out of a pair of upper and lower guide support shafts 45a, 45b for movably supporting the upper and lower end portions of the clutch plate 45 of FIG. 5 between the aforementioned clutch-on position in the proximity of the left frame 1a and the clutch-off position set apart from the left frame 1a.

Further, according to this embodiment of the invention, a second driven pulley 96 is rotatably supported between the spool shaft 5a and the first driven pulley 94 and between the input pulley 92 for the traverse cam shaft 16 and the first driven pulley 94 outside the left frame 1a of the left side plate 3a.

A power transmission belt 98 is wound on the output pulley 90 of the drive gear 10 and the input pulley 92 for the traverse cam shaft 16, pressed by the first driven pulley 94 upward in FIG. 5 and pressed by the second driven pulley 9 downward in FIG. 5 between the output pulley 90 and the input pulley 92.

According to the third embodiment of the invention shown in FIGS. 5–6, the drive force that has been input to the drive gear 10 via the handle shaft 9a of the handle 9 of FIG. 1 is transmitted to the traverse cam shaft 16 via the output pulley 90 of the drive gear 10, the power transmission belt 98 and the input pulley 92.

According to this embodiment of the invention as described above, the output pulley 90, the power transmission belt 98 and the input pulley 92 transmit the drive force from the handle shaft 9a to the fishline parallel-winding unit 15 of FIG. 1 so as to constitute a drive force transmission mechanism 100 for reciprocating the fishline guide body 20 of FIG. 1 with respect to the fishline parallel-winding unit 15.

In comparison with the aforementioned drive force transmission mechanism 25 according to the first embodiment of the invention as shown in FIGS. 1–2 and the drive force transmission mechanism 74 according to the second embodiment of the invention as shown in FIGS. 3–4, the drive force transmission mechanism 100 thus constructed according to the third embodiment of the invention contributes to performing a smooth, quiet fishing operation because no gears are employed. Consequently, manufacturing, assembling and disassembling work is facilitated.

The power transmission belt 98 may be made of any material capable of preventing slipping from being caused with respect to the output pulley 90 and the input pulley 92, offering high resistance to a tensile load and preferable to oils, offering suppleness, and minimizing elongation and heat generation.

The power transmission belt 98 may be a toothed belt, whereas the output pulley 90 and the input pulley 92 may be timing belt pulleys. Further, the power transmission belt 98 may be a chain, whereas the output pulley 90 and the input pulley 92 may be sprockets.

In the aforementioned third embodiment of the invention, since the clutch-off mechanism for moving the clutch plate 45 together with the pinion 7 from the engagement position to the engagement releasing position by switching the clutch switching lever 76 from the clutch-on position to the clutch-off position as described above is similar to what is described in reference to the second embodiment of the invention, and so is the reset mechanism to the reset mechanism 86 in the second embodiment thereof as shown in FIGS. 3–4 in that the reset mechanism in the second embodiment thereof operates to return the clutch plate 45 together with the pinion 7 from the engagement releasing position to the engagement position when the handle 9 is rotated and to simultaneously automatically make the clutch switching lever 76 return from the clutch-off position to the clutch-on position, the description of the clutch-off mechanism and the reset mechanism will be omitted.

Figure 7:
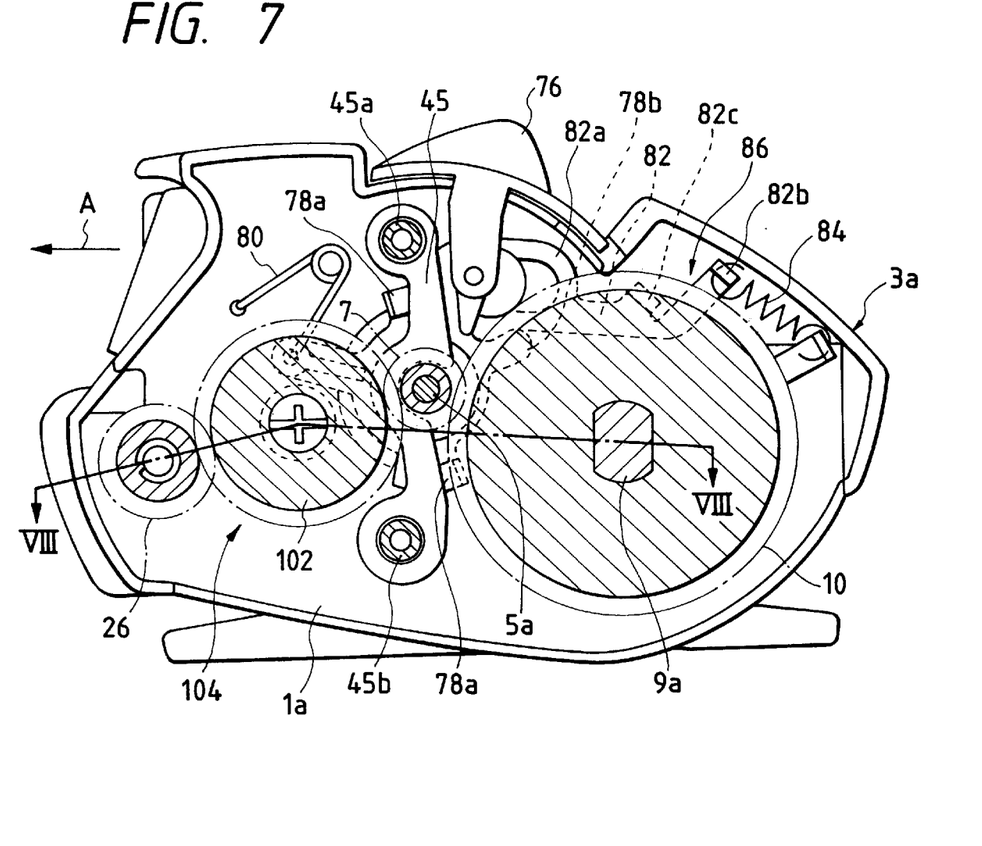
FIG. 7 is a side view of a double-bearing reel for fishing with a cover member removed in order to show an internal structure including a drive force transmission mechanism in the side plate on the handle side of the double-bearing reel for fishing according to a fourth embodiment of the invention.
Figure 8:
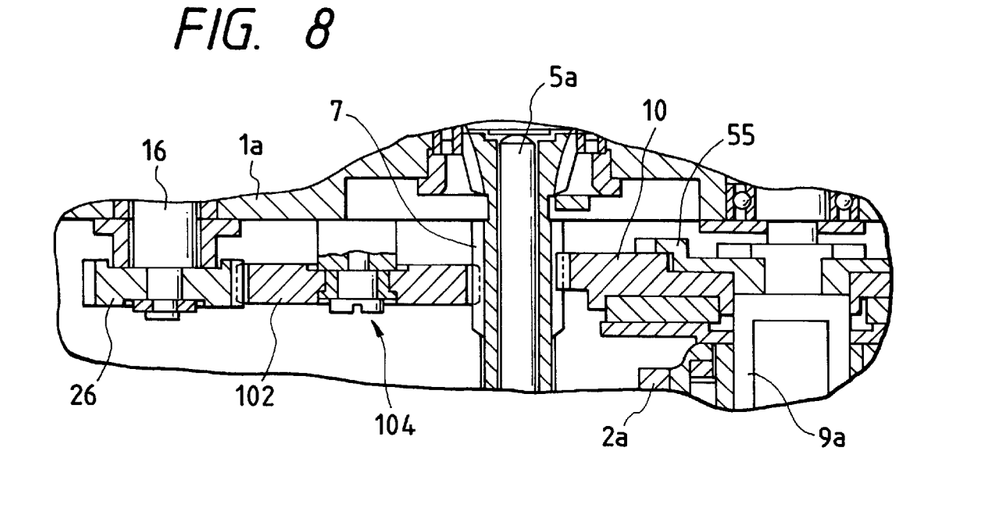
FIG. 8 is a sectional view taken on line VIII—VIII of FIG. 7.

FIG. 7 is a side view of a double-bearing reel for fishing with a cover member removed in order to show an internal structure including a drive force transmission mechanism in the side plate on the handle side of the double-bearing reel for fishing according to a fourth embodiment of the invention, and FIG. 8 a sectional view taken on line VIII—VIII of FIG. 7.

In FIGS. 7–6, like reference characters designate like or corresponding component members of the double-bearing reel for fishing according to the first embodiment of the invention by reference to FIGS. 1–2 and like or corresponding component members of the double-bearing reel for fishing according to the second embodiment of the invention by reference to FIGS. 3–4, and the detailed description of them will be omitted.

According to this embodiment of the invention, a driven gear 102 is rotatably supported between the pinion 7 for the spool shaft 5a and the gear 26 for inputting the drive force to the traverse cam shaft 16 of the fishline parallel-winding unit 15 of FIG. 1 for reciprocating the fishline guide body 20 outside the left frame 1a of the left side plate 3a.

Further, according to the fourth embodiment of the invention as shown in FIGS. 7–8, the drive force that has been input to the drive gear 10 via the handle shaft 9a from the handle 9 of FIG. 1 is transmitted to the traverse cam shaft 16 via the pinion 7, the driven gear 102 and the gear 26.

According to this embodiment of the invention as described above, the drive gear 10, the opinion 7, the driven gear 102 and the gear 26 transmit the drive force from the handle shaft 9a to the fishline parallel-winding unit 15 of FIG. 1 so as to constitute a drive force transmission mechanism 104 for reciprocating the fishline guide body 20 of FIG. 1 with respect to the fishline parallel-winding unit 15.

More specifically, the drive force transmission mechanism 104 according to the fourth embodiment of the invention thus arranged includes a spool-shaft driving force transmission means which is the combination of the drive gear 10 for transmitting the drive force from the handle shaft 9a to the spool shaft 5a and the pinion 7, and a fishline parallel-winding unit driving force transmission means which is the combination of the driven gear 102 and the gear 26 for transmitting the drive force from the spool-shaft driving force transmission means like this to the fishline parallel-winding unit 15 of FIG. 1.

Although only the combination of the driven gear 102 and the gear 26 is placed between the pinion 7 and the traverse cam shaft 16 in the aforementioned fourth embodiment of the invention, more than one driven gear may be placed between the pinion 7 and the gear 26 as in the drive force transmission mechanism 25 according to the first embodiment of the invention as shown in FIGS. 1–2.

The spool-shaft driving force transmission means for transmitting the drive force from the handle shaft 9a to the spool shaft 5a may be arranged so as to place not less than one driven gear between the drive gear 10 and the pinion 7, or otherwise by making the drive gear 10 of the handle shaft 9a a bevel gear, making the pinion 7 for the spool shaft 5a also a bevel gear or adding a bevel gear to the pinion 7 so as to place, between the bevel drive gears of the handle shaft 9a and the bevel pinion, a drive force transmission shaft such as the drive force transmission shaft 64 with the bevel pinions fixed to the respective ends thereof according to the second embodiment of the invention as shown in FIGS. 3–4. By making the drive gear 10 of the handle shaft 9a an output pulley and replacing the pinion 7 for the spool shaft 5a with an input pulley or adding an input pulley to the pinion 7 like the third embodiment of the invention as shown in FIGS. 5–6, further, a power transmission belt may be stretched between the output and input pulleys in the spool shaft driving force transmission means.

This is also the case with the fishline parallel-winding unit driving force transmission means for transmitting the drive force from the spool-shaft driving force transmission means to the fishline parallel-winding unit 15 of FIG. 1; more specifically, the fishline parallel-winding unit driving force transmission means may be arranged by making the pinion 7 for the spool shaft 5a a bevel gear or adding a bevel gear to the pinion 7 and making the gear 26 for inputting the drive force to the traverse cam shaft 16 a bevel gear so as to place, between the bevel gears of the spool shaft 5a and the bevel gear for the traverse cam shaft 16, a drive force transmission shaft such as the drive force transmission shaft 64 with the bevel pinions fixed to the respective ends thereof according to the second embodiment of the invention as shown in FIGS. 3–4. Further, by replacing the pinion 7 for the spool shaft 5a with a pulley or adding a pulley to the pinion 7 and replacing the gear 26 for inputting the drive force to the traverse cam shaft 16 with a pulley like the third embodiment of the invention as shown in FIGS. 5–6, a power transmission belt may be stretched between these pulleys in the fishline parallel-winding unit driving force transmission means.

When the spool-shaft driving force transmission means is arranged so that not less than one driven gear is placed between the drive gear 10 and the pinion 7, the fishline parallel-winding unit driving force transmission means may be supplied with the drive force from not less than one driven gear between the drive gear 10 and the pinion 7. When the spool-shaft driving force transmission means is arranged so that, by making the drive gear 10 of the handle shaft 9a a bevel gear, making the pinion 7 for the spool shaft 5a also a bevel gear or adding a bevel gear to the pinion 7, a drive force transmission shaft such as the drive force transmission shaft 64 with the bevel pinions fixed to the respective ends thereof according to the second embodiment of the invention as shown in FIGS. 3–4 is placed between the bevel drive gears, the fishline parallel-winding unit driving force transmission means may be supplied with the drive force from the drive force transmission shaft 64. When, moreover, the spool-shaft driving force transmission means is arranged so that a power transmission belt is stretched between output and input pulleys by making the drive gear 10 of the handle shaft 9a an output pulley and replacing the pinion 7 for the spool shaft 5a with an input pulley or adding an input pulley to the pinion 7, the fishline parallel-winding unit driving force transmission means may be supplied with the drive force via the power transmission belt.

In the aforementioned fourth embodiment of the invention, since the clutch-off mechanism for moving the clutch plate 45 together with the pinion 7 from the engagement position to the engagement releasing position by switching the clutch switching lever 76 from the clutch-on position to the clutch-off position as described above is similar to what is described in reference to the second embodiment of the invention, and so is the reset mechanism to the reset mechanism 86 in the second embodiment thereof as shown in FIGS. 3–4 in that the reset mechanism in the second embodiment thereof operates to return the clutch plate 45 together with the pinion 7 from the engagement releasing position to the engagement position when the handle 9 is rotated and to simultaneously automatically make the clutch switching lever 76 return from the clutch-off position to the clutch-on position, the description of the clutch-off mechanism and the reset mechanism will be omitted.

As set forth above, according to the present invention, since the handle shaft fitted with the handle is set close to the body of an angler, the side space is tightened during the handle winding operation with the effect of making a stable fishline-winding operation possible. Moreover, since the drive force transmission mechanism for reciprocating the fishline guide body with respect to the fishline parallel-winding unit by transmitting the drive force from the handle shaft to the fishline parallel-winding unit is provided between the handle shaft in the handle-side plate and the fishline parallel-winding unit, the fishline playing-out operation is improvable. Therefore, a double-bearing reel for fishing which offers excellent assembling-disassembling workability is made available.

What is claimed is:

1. A double-bearing reel for fishing, comprising:
   a reel body including two side plates;
   a spool shaft supported between said two side plates;
   a spool rotatable supported by said spool shaft;
   a handle shaft rotatable supported by one of said two side plates of said reel body, and a handle connected to said handle shaft for turning said handle shaft to rotate said spool;

a fishline parallel-winding unit supported by said reel body, said fishline parallel-winding unit including a traverse cam shaft and a fishline guide body that reciprocates along said traverse cam shaft in an axial direction of said spool in order to wind a fishline evenly on said spool, wherein said handle shaft is positioned opposite from said fishline parallel-winding unit with respect to said spool shaft; and a drive force transmission mechanism provided entirely within said one of said two side plates, and between said handle shaft and said fishline parallel-winding unit, said drive force transmission mechanism transmitting a drive force from said handle shaft to said fishline parallel-winding unit to make said fishline guide body reciprocate in said axial direction, wherein said drive force transmission mechanism comprises a gear train including a drive gear mounted on said handle shaft, a driven gear mounted on an end of said traverse cam shaft, and an intermediate gear between said drive gear and said driven gear.

2. A double-bearing reel for fishing as claimed in claim 1, wherein said drive force transmission mechanism includes spool-shaft driving force transmission means for transmitting the drive force from said handle shaft to said spool shaft, and fishline parallel-winding unit driving force transmission means for transmitting the drive force from said spool-shaft driving force transmission means to said fishline parallel-winding unit.

3. A double-bearing reel for fishing, comprising:

a reel body including two side plates;

a spool shaft supported between said two side plates;

a spool rotatable supported by said spool shaft;

a handle shaft rotatably supported by one of said two side plates of said reel body, and a handle connected to said handle shaft for turning said handle shaft to rotate said spool;

a fishline parallel-winding unit supported by said reel body, said fishline parallel-winding unit including a fishline guide body that reciprocates in an axial direction of said spool in order to wind a fishline evenly on said spool, wherein said handle shaft is positioned opposite from said fishline parallel-winding unit with respect to said spool shaft; and a drive force transmission mechanism provided in said one of said two side plates, and between said handle shaft and said fishline parallel-winding unit, said drive force transmission mechanism transmitting a drive force from said handle shaft to said fishline parallel-winding unit to make said fishline guide body reciprocate in said axial direction, wherein said drive force transmission mechanism includes:

a drive gear mounted on said handle shaft;

a driven gear mounted on an end of a traverse cam shaft in said fishline parallel-winding unit; and a gear train including a plurality of gears interposed between said drive gear and said driven gear, without engaging a pinion provided on said spool shaft.

4. A double-bearing reel as claimed in claim 3, further comprising:

a clutch mechanism for selectively disengaging said spool shaft from said pinion, wherein when said pinion is disengaged from said spool shaft, said spool is free from said handle shaft while said fishline guide body is free from said spool.

5. A double-bearing reel as claimed in claim 4, further comprising means for reengaging said pinion with said spool shaft.

6. A double-bearing reel for fishing, comprising:

a reel body including two side plates;

a spool shaft supported between said two side plates;

a spool rotatably supported by said spool shaft;

a handle shaft rotatable supported by one of said two side plates of said reel body, and a handle connected to said handle shaft for turning said handle shaft to rotate said spool;

a fishline parallel-winding unit supported by said reel body, said fishline parallel-winding unit including a fishline guide body that reciprocates in an axial direction of said spool in order to wind a fishline evenly on said spool, wherein said handle shaft is positioned opposite from said fishline parallel-winding unit with respect to said spool shaft; and a drive force transmission mechanism provided in said one of said two side plates, and between said handle shaft and said fishline parallel-winding unit, said drive force transmission mechanism transmitting a drive force from said handle shaft to said fishline parallel-winding unit to make said fishline guide body reciprocate in said axial direction, wherein said drive force transmission means includes:

a large bevel gear formed on a drive gear fixed to said handle shaft;

a small bevel gear mounted on a traverse cam shaft in said fishline parallel-winding unit; and a drive force transmission shaft having, at respective ends, a pair of bevel gears meshed with said large and small bevel gears.

7. A double-bearing reel as claimed in claim 6, further comprising:

a clutch mechanism for selectively disengaging said spool shaft from a pinion slidably mounted on said spool shaft, wherein when said pinion is disengaged from said spool shaft, said spool is free from said handle shaft while said fishline guide body is free from said spool.

8. A double-bearing reel as claimed in claim 7, further comprising means for reengaging said pinion with said spool shaft.

9. A double-bearing reel for fishing, comprising:

a reel body including two side plates;

a spool shaft supported between said two side plates;

a spool rotatably supported by said spool shaft;

a handle shaft rotatable supported by one of said two side plates of said reel body, and a handle connected to said handle shaft for turning said handle shaft to rotate said spool;

a fishline parallel-winding unit supported by said reel body, said fishline parallel-winding unit including a fishline guide body that reciprocates in an axial direction of said spool in order to wind a fishline evenly on said spool, wherein said handle shaft is positioned opposite from said fishline parallel-winding unit with respect to said spool shaft; and a drive force transmission mechanism provided in said one of said two side plates, and between said handle shaft and said fishline parallel-winding unit, said drive force transmission mechanism transmitting a drive force from said handle shaft to said fishline parallel-winding unit to make said fishline guide body reciprocate in said axial direction, wherein said drive force transmission mechanism includes:

an output pulley mounted on said handle shaft;

an input pulley mounted on an end of a traverse cam shaft in said fishline parallel-winding unit; and a power transmission belt suspended between said output and input pulleys.

10. A double-bearing reel as claimed in claim 9, further comprising:

a clutch mechanism for selectively disengaging said spool shaft from a pinion slidably mounted on said spool shaft, wherein when said pinion is disengaged from said spool shaft, said spool is free from said handle shaft while said fishline guide body is free from said spool.

11. A double-bearing reel as claimed in claim 10, further comprising means for reengaging said pinion with said spool shaft.

12. A double-bearing reel, comprising:

a reel body including two side plates;

a spool shaft supported between said two side plates;

a spool rotatable supported by said spool shaft;

a handle shaft rotatably supported by one of said two side plates of said reel body, and a handle connected to said handle shaft for turning said handle shaft to rotate said spool;

a fishline parallel-winding unit supported by said reel body, said fishline parallel-winding unit including a fishline guide body that reciprocates in an axial direction of said spool in order to wind a fishline evenly on said spool, wherein said handle shaft is positioned opposite from said fishline parallel-winding unit with respect to said spool shaft; and a drive force transmission mechanism provided in said one of said two side plates, and between said handle shaft and said fishline parallel-winding unit, said drive force transmission mechanism transmitting a drive force from said handle shaft to said fishline parallel-winding unit to make said fishline guide body reciprocate in said axial direction, wherein said drive force transmission mechanism includes:

a drive gear mounted on said handle shaft;

a pinion mounted on said spool shaft and meshed with said drive gear;

an intermediate gear rotatably supported by said reel body and meshed with said pinion; and a driven gear mounted on an end of a traverse cam shaft in said fishline parallel-winding unit, and meshed with said intermediate gear.

13. A double-bearing reel as claimed in claim 12, further comprising:

a clutch mechanism for selectively disengaging said spool shaft from said pinion, wherein when said pinion is disengaged from said spool shaft, said spool is free from said handle shaft while said fishline guide body is free from said spool.

14. A double-bearing reel as claimed in claim 13, further comprising means for reengaging said pinion with said spool shaft.

* * * * *